(12) United States Patent
Hayashi (10) Patent No.: US 6,240,093 B1
(45) Date of Patent: May 29, 2001

(54) TRANSFER METHOD OF PUSH-BUTTON SIGNALS (75) Inventor: Hitoshi Hayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/052,092

(22) Filed: Mar. 31, 1998

(30) Foreign Application Priority Data

Jul. 14, 1997 (JP) .................................................... 9-188139

(51) Int. Cl.$^7$ ................................................ H04L 12/06
(52) U.S. Cl. .................................... 370/410; 379/283
(58) Field of Search .................................... 370/410, 412; 379/31, 88.01, 88.22, 282, 283, 339, 353

(56) References Cited

U.S. PATENT DOCUMENTS

| | | | | |
|---|---|---|---|---|
| 4,088,838 | * | 5/1978 | Nakata et al. | 379/88.01 |
| 4,431,872 | * | 2/1984 | Edwards et al. | 379/351 |
| 4,518,827 | * | 5/1985 | Sagara | 379/67.1 |
| 5,214,689 | * | 5/1993 | O'Sullivan | 379/88.1 |

FOREIGN PATENT DOCUMENTS

| | | | |
|---|---|---|---|
| 59-27660 | 2/1984 | (JP) . | |
| 63-290054 | * 11/1988 | (JP) | H04M/3/42 |
| 01284197 | * 11/1989 | (JP) | H04Q/1/457 |
| 03082259 | * 4/1991 | (JP) | H04M/11/00 |
| 3-85892 | 4/1991 | (JP) . | |
| 3-23556 | 10/1991 | (JP) . | |
| 07283869 | * 10/1995 | (JP) | H04M/3/42 |

* cited by examiner

Primary Examiner—Hassan Kizou
Assistant Examiner—Ahmed Elallam
(74) Attorney, Agent, or Firm—Helfgott & Karas, P.C.

(57) ABSTRACT

A transfer method of a push-button signal includes the steps of detecting a push-button signal created by an end user terminal during a state in which the end user terminal is connected to a remote service system by an exchange via a network, by using a push-button signal receiver, encoding the push-button signal detected by the push-button signal receiver to a produce a push-button transfer signal by using the push-button signal receiver, and transmitting the push-button transfer signal to the service system from the exchange to the service system via a signal line of the network.

8 Claims, 10 Drawing Sheets

| PB signal | No. of PB signal | 0000<br>Filler | xxxx<br>Heading code<br>H 1 | xxxx<br>Heading code<br>H 0 | Label |
|---|---|---|---|---|---|

FIG. 9

| H G F E D C B A | xxxx | xxxx | |
|---|---|---|---|
| Request type Indicators | Heading code<br>H 1 | Heading code<br>H 0 | Label |

FIG. 10

| | 8 | 7 | 6 | 5 | 4 | 3 | 2 | 1 |
|---|---|---|---|---|---|---|---|---|
| 0 | Message code(xxxxxxxx) ||||||||
| 1 | Pointer to parameter A = 1 ||||||||
| 2 | Length indicator for parameter A ||||||||
| 3 | odd/even | Spare |||||||
| 4 | Spare | Spare || Spare ||||
| 5 | 2nd PB signal |||| 1st PB signal ||||
| | | | | | | | | |
| n | Filler(If necessary) |||| nth PB signal ||||

TRANSFER METHOD OF PUSH-BUTTON SIGNALS

BACKGROUND OF THE INVENTION

The present invention generally relates to telecommunication systems and more particularly to a transfer of push-button signals from a terminal to a service system via an exchange.

Conventionally, it is practiced to provide various services such as reservation of air tickets, collection of questionnaires, and the like, by transferring push-button signals created by a push-button telephone set or a personal computer having an equivalent function to an appropriate service system.

Figure 1:
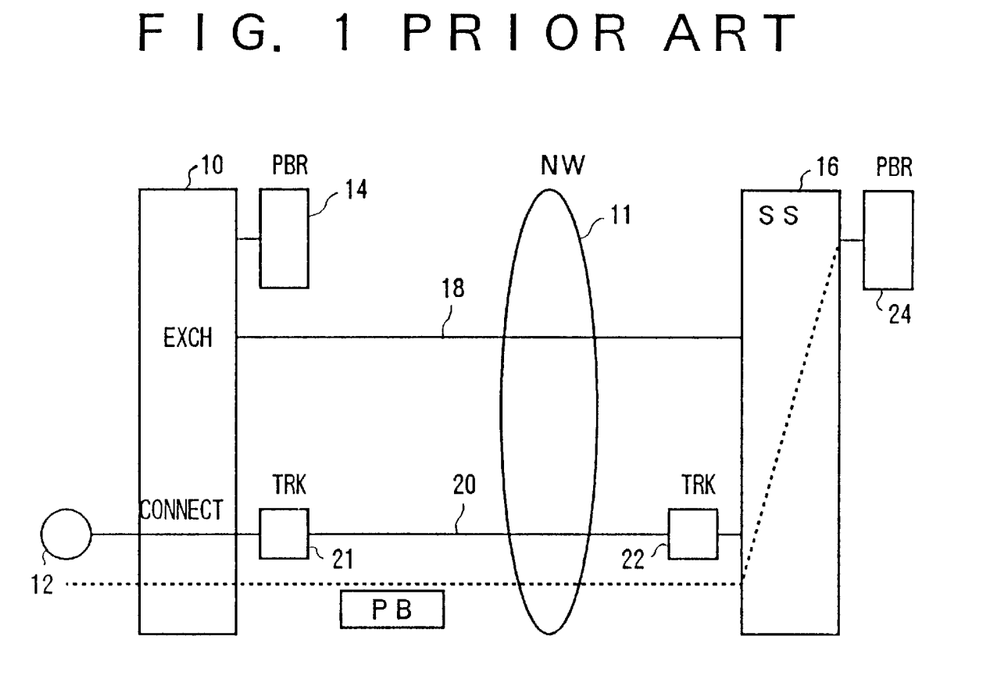
FIG. 1 is a diagram showing the construction of a conventional telecommunication system.

FIG. 1 shows the construction of a conventional transfer system of push-button signals.

Referring to FIG. 1, an exchange 10 carries out a switching of a network (NW) 11 and accommodates therein a line to an end user terminal 12, which may be a push-button telephone or a personal computer having an equivalent function. The exchange 10 further includes a push-button signal receiver (PBR) 14 for detecting push-button signals supplied from the end user terminal 12 to the exchange 10, wherein the push-button signal receiver 14 further converts the detected push-button signals to a corresponding code. As a result of the foregoing conversion, the address (telephone number) of the destination terminal is recognized when a call is issued by the end user terminal 12.

Further, it should be noted that the network 11 is connected to a service system (SS) 16 that provides various services such as reservation of air tickets or collection of questionnaires. The network 11 may use a common-line transmission process in which various monitoring and control signals are transmitted through a common signal line 18. For the transmission of an audio signal, an audio-channel 20 is provided. It should be noted that the exchange 10 and the service system 16 are connected to the audio-channel 20 via trunks (TRK) 21 and 22. Further, the service system 16 also includes a push-button signal receiver (PBR) 24.

In operation, a push-button signal issued by the user at the terminal 12 during a state in which there is a circuit connection between the end user terminal 12 and the service system 16, is transferred to the service system 16 from the exchange 10 to the audio-channel 20, wherein the push-button signal receiver 24 of the service system 16 detects the push-button signal and converts the same into a corresponding code.

In such a conventional system, in which the exchange 10 accommodates therein the line to the end user terminal 12, it is essential that the exchange 10 has the push-button signal receiver 14 for detecting the destination address supplied from the end user terminal 12 at the time of setting up a call in the form of push-button signals and for converting the push-button signals to a corresponding code. On the other hand, the conventional system of FIG. 1, in which the push-button signals are transmitted through the audio-channel 20, has required the service system 16 to have the push-button signal receiver 24 also in addition to the push-button signal receiver 14, for detecting the push-button signals transmitted through the audio-channel 20 and for converting the same to a corresponding code. Thereby, there has been a problem in the conventional system of FIG. 1 that the cost of investment is excessive.

Further, in the conventional system of FIG. 1, there has been a problem in that the push-button signal, supplied by the end user at the terminal 12 and transmitted through the audio-channel 20, may experience attenuation as it is propagated through the audio-channel 20 for a long distance. Thereby, there is a substantial risk hat the transmittance of the push-button signals is impaired and the chance of erroneous reception at the service system 16 is increased.

SUMMARY OF THE INVENTION

Accordingly, it is a general object of the present invention to provide a novel and useful transfer method of push-button signals wherein the foregoing problems are eliminated.

Another and more specific object of the present invention is to provide a transfer method of push-button signals to a service system, wherein the need of providing a push-button signal receiver in the service system is eliminated and wherein the risk of erroneous reception of the push-button signals is reduced substantially.

Another object of the present invention is to provide a transfer method of a push-button signal in an exchange connected to a network, said exchange accommodating therein a line to a terminal, said exchange including a push-button signal receiver for detecting a push-button signal created by said end terminal and for converting said push-button signal to a corresponding code, said method comprising the steps of:

detecting a push-button signal created by said terminal, during a state in which said exchange connects said terminal to a remote service system via said network, by using said push-button signal receiver;

encoding said push-button signal detected by said push-button signal receiver to a produce a push-button transfer signal corresponding to said push-button signal by using said push-button signal receiver; and transmitting said push-button transfer signal to said service system from said exchange to said service system via a signal line of said network.

According to the present invention, it is no longer necessary to provide additional push-button signal receiver in the remote service system and the cost of the service system is reduced, without increasing the cost of the exchange. As the push-button signals are transmitted from the exchange to the remote service system through the signal line of the network, not through the audio-channel, in the form of encoded push-button transfer signals, the problem of signal decay of the transmitted push-button transfer signal is eliminated and a reliable transfer is achieved for the information of the original push-button signals. It should be noted that the push-button signal receiver of the exchange is the same push-button signal receiver used for setting up a circuit between the terminal and the service system.

Other objects and further features of the present invention will become apparent from the following detailed description when read in conjunction with the attached drawings.

DETAILED DESCRIPTION OF THE PREFERRED EMBODIMENTS

Figure 2:
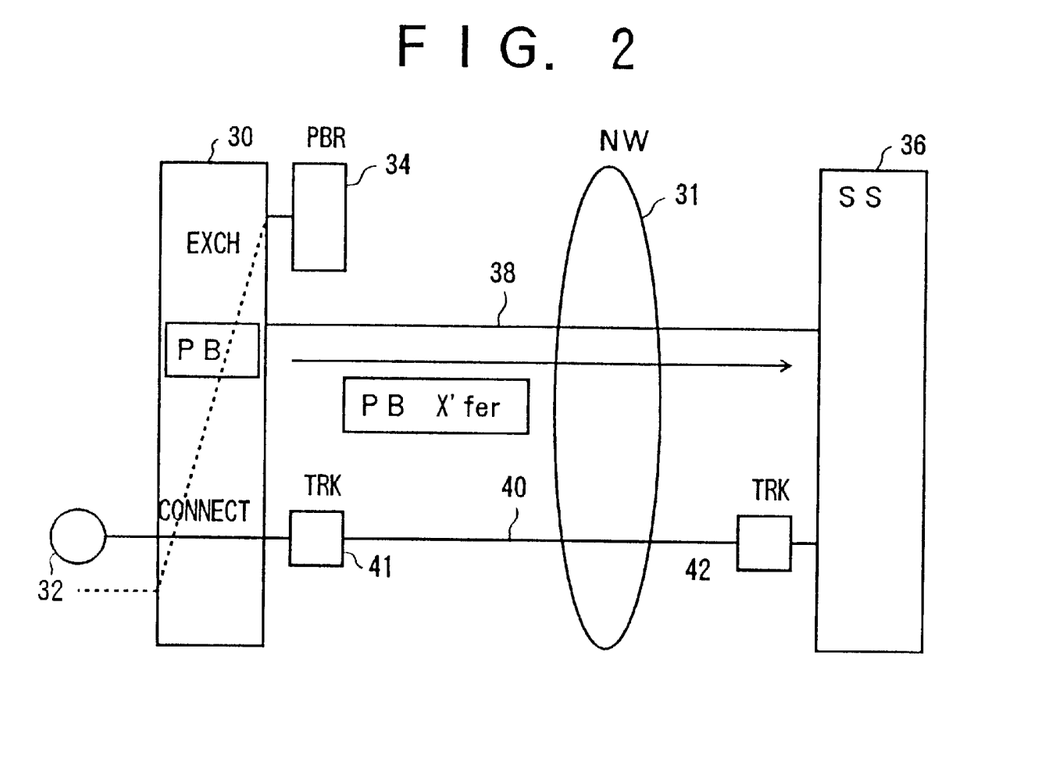
FIG. 2 is a diagram showing the construction of a telecommunication system of the present invention.

FIG. 2 shows the construction of a telecommunication system to which the present invention is used.

Referring to FIG. 2, the telecommunication system includes an exchange 30 for switching a public network (NW) 31 and accommodates therein a line extending to an end user terminal 32, which may be a push-button telephone or a personal computer having the same function. The exchange 30 includes a push-button signal receiver (PBR) 34, wherein the PBR 34 is used at the time of setting up a circuit between the terminal 32 and a destination terminal so as to detect the push-button signals supplied from the terminal 32 to the exchange 30 for designation of the destination terminal. Thereby, the PBR 34 further encodes the push-button signals thus supplied and converts the same to a code corresponding to the push-button signals. The exchange 30 recognizes the destination address based on the code thus obtained by the PBR 34.

Further, it should be noted that the construction of FIG. 2 further includes a service system (SS) 36 connected to the public network 31. The public network 31 uses the common signal line process for transmission of signals, in which a common signal line 38 is used for monitoring and control purposes while the audio signal is transmitted through an audio-channel 40. Each of the exchange 30 and the service system 36 is connected to the audio-channel 40 via a trunk (TRK) 41 or a trunk (TRK) 42.

Figure 3:
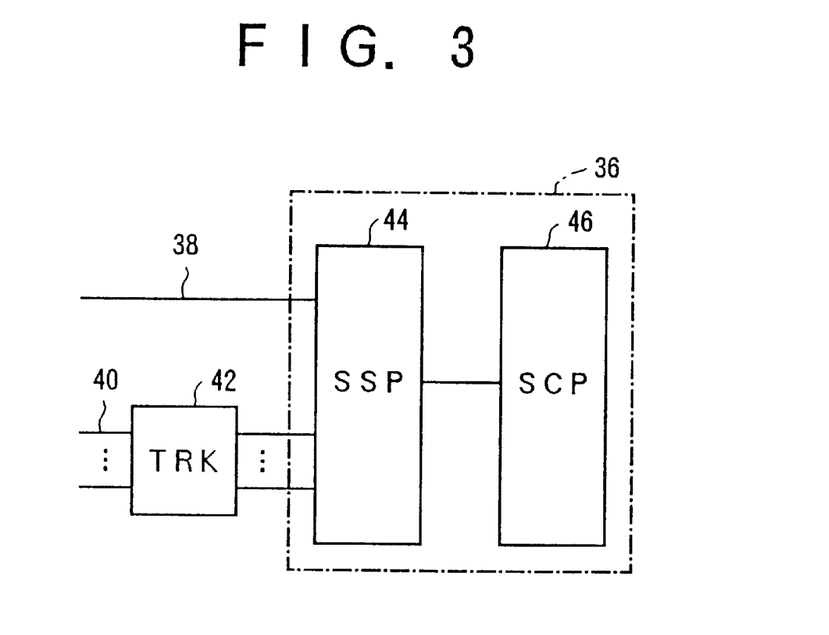
FIG. 3 is a diagram showing a part of the system of FIG. 2 in detail.

FIG. 3 shows the construction of the service system 36.

Referring to FIG. 3, the service system 36 includes a service switching point (SSP) 44 and a service control point (SCP) 46, wherein the service switching point 44 is connected to the audio-channel 40 of the public network 31 via the trunk 42 and further to the common signal line 38 of the public network 31 for switching connection similarly to the exchange 30 between the public network 31 and the service control point 46.

The service control point 46 provides various services such as reservation of air tickets, collection of questionnaires, and the like and is connected to the end user terminal 32 via the service switching point 44 and the public network 31.

Figure 4:
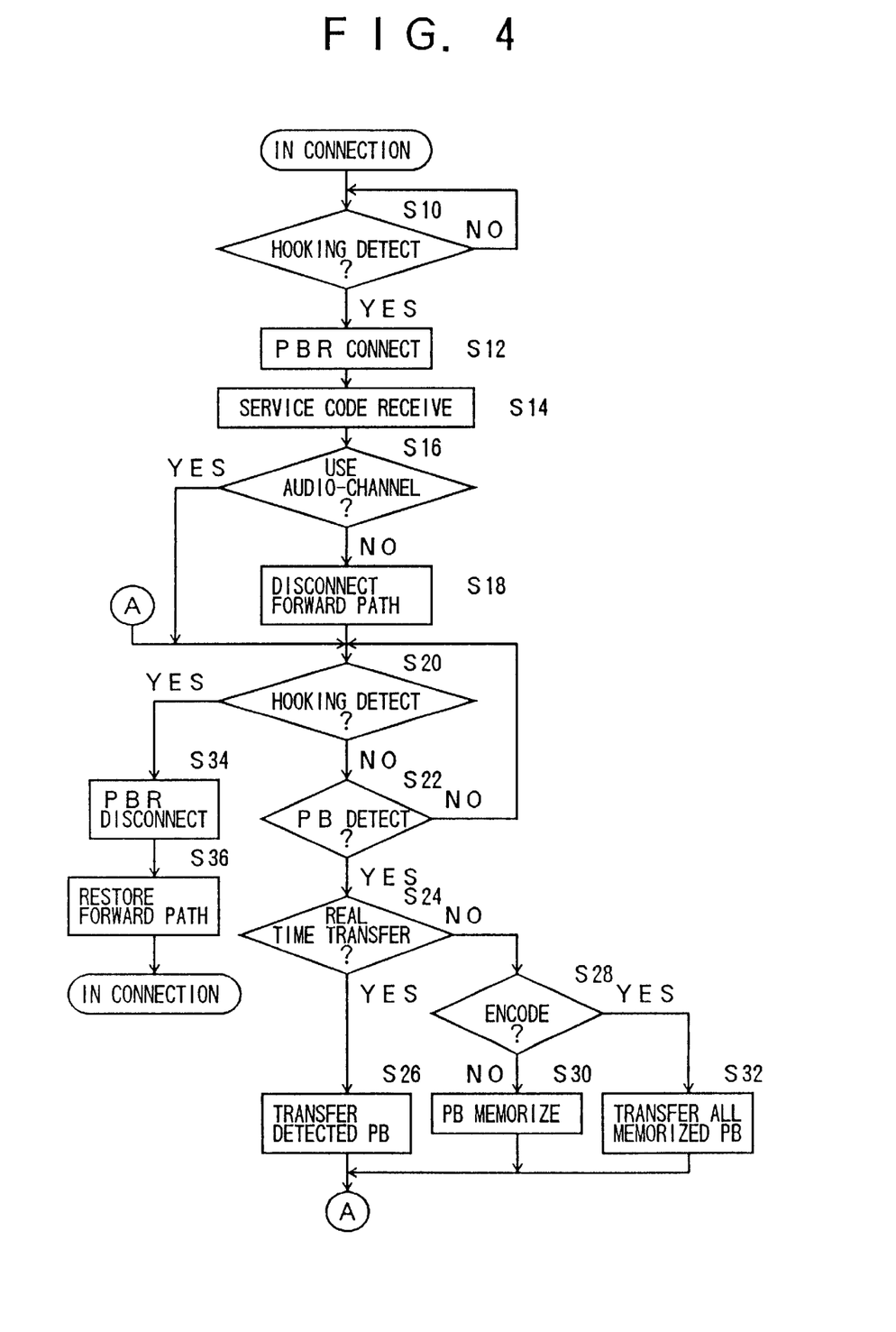
FIG. 4 is a flowchart showing an operation of an exchange included in the system of FIG. 2 according to a first embodiment of the present invention.

FIG. 4 shows the operation of the exchange 30 for processing the push-button signals according to a first embodiment of the present invention in the form of a flowchart.

Referring to FIG. 4, the processing is conducted for each circuit connection in the state that the circuit connection is established between the end user terminal 32 and the service system 36 and is started from a step S10 in which a discrimination is made whether or not a hooking at the end user terminal 32 is detected. When a hooking (on-hook state for a minute interval) is detected, the process step proceeds to a step S12 in which the PBR 34 is connected to the circuit provided by the exchange 30 so as to be able to detect the push-button signals and convert the same to a corresponding code. As a result of the step S12, the system undergoes a transition to a state ready to receive a service code.

Next, in the step S14, the push-button signals input by the user at the terminal 32 as the service code is received by the PBR 34 and the service code thus supplied is converted by the PBR 34 to a corresponding code or encoded push-button transfer signal. In the step of S14, the user may input one of the following service codes: "*11"; "*12"; "*13" and "*14".

* 11: No use of the audio-channel 40 for the transfer of signals. Each character is transmitted immediately in real time.
* 12: No use of the audio-channel 40 for the transfer of signals. The characters are transmitted as a lump in response to detection of the encode character "#".
* 13: Use the audio-channel 40 in addition to the signal line 38 for the transfer of signals in addition to the common signal line 38. Transfer of each character occurs immediately in real time.
* 14: Use the audio-channel 40 in addition to the signal line 38 for the transfer of signals in addition to the common signal line 38. The character are transmitted as a lump in response to detection of the encode character "#".

Figure 6:
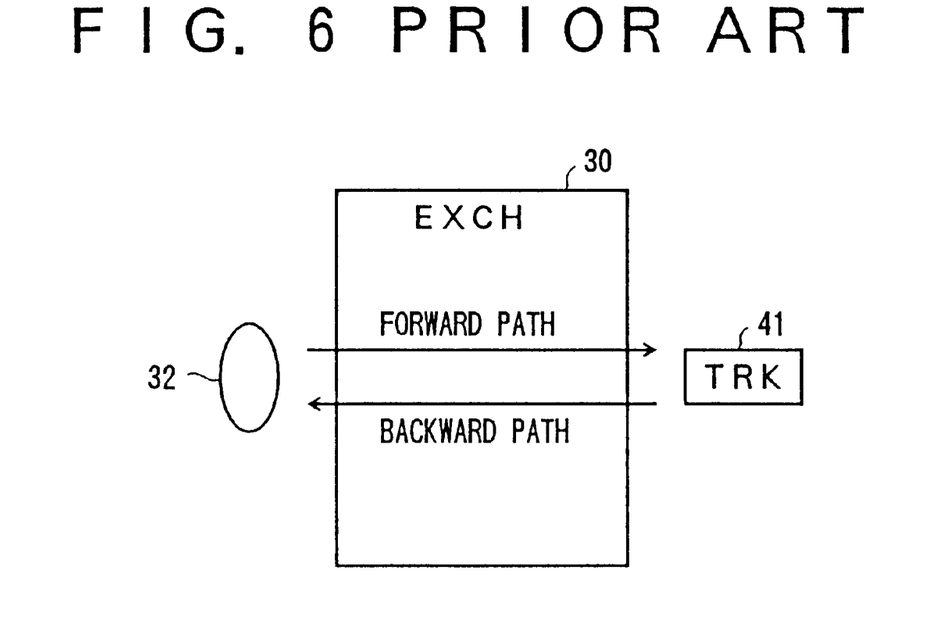
FIG. 6 is a diagram explaining an audio-channel path inside the exchange of FIG. 2.
Figure 7:
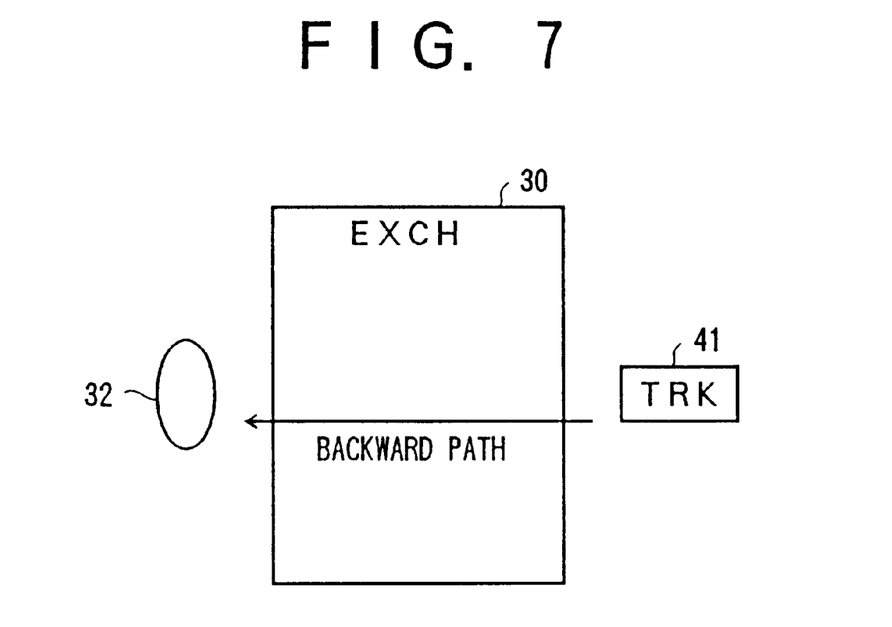
FIG. 7 is another diagram explaining a disconnection of the audio-channel path in the exchange of FIG. 2 according to the present invention.

Next, in the step S16, a discrimination is made whether or not the service-code setting detected in the step S14 indicates the use of the audio-channel 40 for the transfer of the push-button signals in addition to the common signal line 38, and a step S18 is conducted if the result of the step S16 is NO and the audio-channel 40 is not to be used for the transfer of the push-button signals. In this case, a forward path of the audio signals, which forms the audio signal channel 40 in the exchange 30 together with a backward audio signal path as indicated in FIG. 6, is disconnected and the state of the exchange 30 changes to the state shown in FIG. 7. Thereby, the push-button signals are no longer carried to the service system 36 through the audio-channel 40 that connects the exchange 30 to the service system 36. After the step S18, the system undergoes a transition to a push-button signal transfer mode.

When the result of the step S16 is YES and the audio-channel 40 is to be used for transferring signals in addition to the signal line 38, on the other hand, the system undergoes a transition to the push-button signal transfer mode while maintaining the state of FIG. 6.

Thereafter, a step S20 is conducted for discriminating whether or not the hooking is detected, and if the result is NO, a further discrimination is made in the step S22 as to whether or not the push-button signal from the terminal 32 is detected. When a push-button signal is detected, a step S24 is conducted whether or not the service code indicates the immediate, real time transfer mode. If the result of the step S24 is YES, the process step proceeds to a step S26, wherein the code of the push-button signal detected and converted by the PBR 34 is transferred to the service system 36 as the push-button transfer signal via the common signal line 38. After the step S26, the process step returns to the step S20.

When the result of the step S24 is NO and the real time transfer is not necessary, on the other hand, the process step proceeds to a step S28 wherein a discrimination is made whether or not the current push-button signal indicates the encode character "#". When the result is NO, the code of the push-button signal detected and converted by the PBR 34 in the step of S12 is memorized in the step S30 and the process step returns to the step S20. Further, when the result of the step S28 is YES, the step S32 is conducted in which the entire memorized codes of the push-button signals are transferred to the service system 36 via the signal line 38 as the push-button transfer signal. In this mode of transfer, a code "F" is added to the end of the transferred codes as a stop digit.

Further, when a hooking is detected in the step S20, a step S34 is conducted in which the PBR 34 is disconnected from the circuit under use, and a step S36 is conducted for restoring the forward path to the state of FIG. 6. After the step S36, the original connection state is restored.

Figure 5:
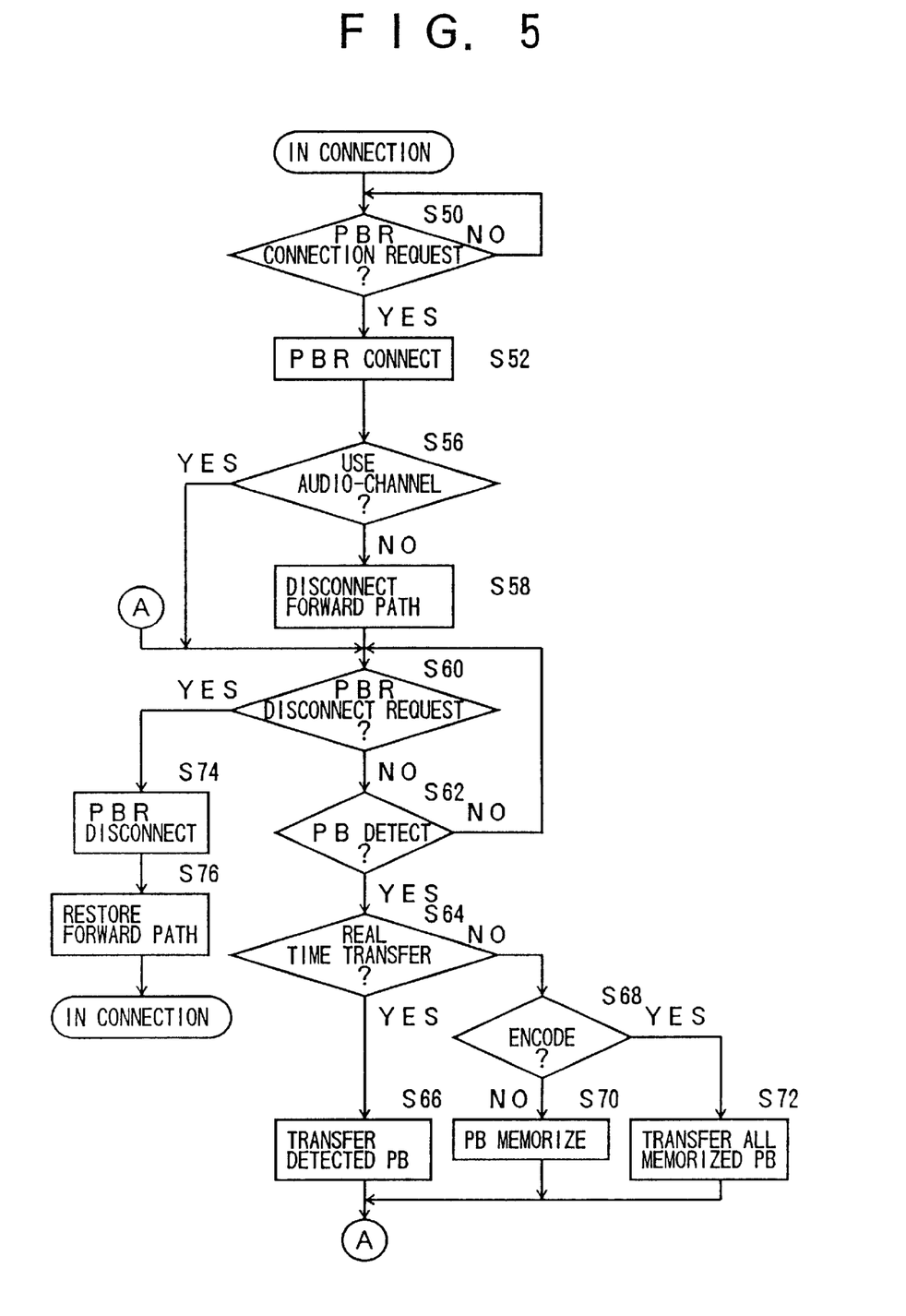
FIG. 5 is a flowchart showing an operation of an exchange included in the system of FIG. 2 according to a second embodiment of the present invention.

FIG. 5 shows the processing conducted by the exchange 30 for processing the push-button signals according to a second embodiment of the present invention. It should be noted that the process of FIG. 5 is carried out for each circuit connection similarly to the process of FIG. 4.

Referring to FIG. 5, a step S50 is conducted first, in which a discrimination is made whether or not a PBR connection request is received from the service system 36 and the process step proceeds to a step S52 when the result of the step S50 is YES. Thereby, the PBR 34 is connected in the step S52 to the current circuit connection sustained by the exchange 30 for enabling a detection and conversion of the push-button signals to the corresponding codes.

Next, in the step S56, a discrimination is made whether or not the setting of the PBR connection request indicates use of the audio-channel 40 in addition to the common signal line 38. If the result is NO, the forward path is disconnected in the step S58 so that the push-button signals are not transmitted through the audio-channel 40. After the step S58, the system undergoes a transition to a push-button signal transfer mode. When the result of the step S56 is YES, on the other hand, the system undergoes the transition to the push-button signal transfer mode while maintaining the state of FIG. 6.

After the step S58, a step S60 is conducted in which a discrimination is made whether or not a PBR disconnect request signal is received from the service system 36, and if the result is NO, a step S62 is conducted in which a further discrimination is made whether or not the push-button signals from the terminal 32 are detected. If the result of the step S62 is YES, a step S64 is conducted in which a discrimination is made whether or not the PBR connection request signal indicates the real time transfer mode. If the result of the step S64 is YES, the process step proceeds to the step S66 in which the code of the push-button signals detected by the PBR 34 is transferred to the service system 36 via the common signal line 38 as the push-button transfer signal and the process step returns to the step S60.

When the result of the step S64 is NO, on the other hand, the process step proceeds to the step S68 in which a discrimination is made whether or not the push-button signal represents the encode character "#". If the result is NO, a step S70 is conducted in which the code detected and converted by the PBR 34 is memorized and the process step returns to the step S60. When the result of the step S68 is YES, on the other hand, the process step proceeds to the step S72 and the all the memorized code of the push-button signals are transferred to the service system 36 via the common signal line 38 as the push-button transfer signal and the process returns to the step S60. During the transfer of the code in the step S72, a code "F" is added to the end of the codes to be transmitted as a stop digit.

Further, when the result of the step S60 is YES and there is a request from the service system 36 to disconnect the PBR 34, the process step proceeds to the step S74 and the PBR 34 is disconnected from the current circuit connection. Further, the forward path is restored in the step S76 as indicated in FIG. 6 and the telecommunication system returns to the original communication state.

Figure 8:
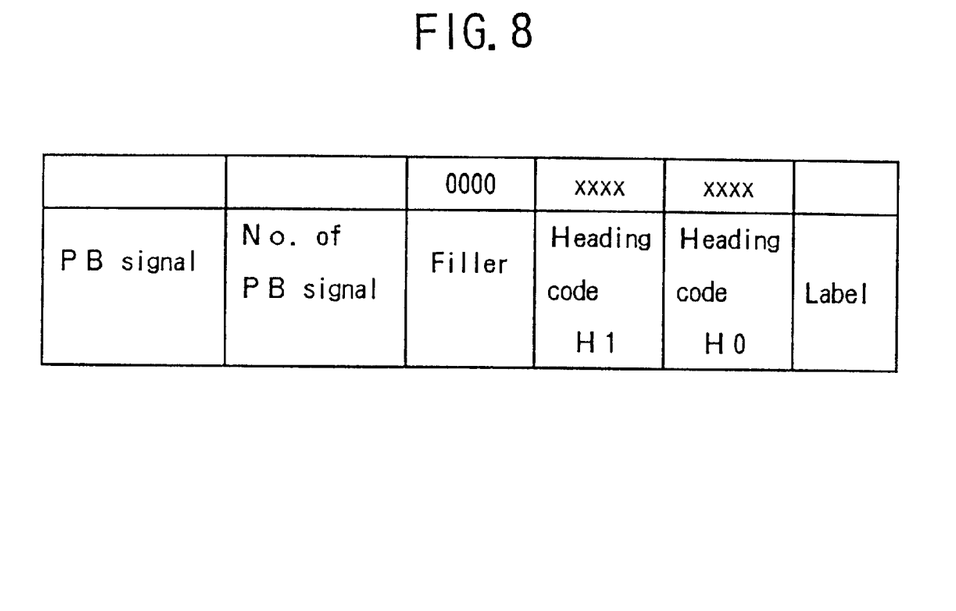
FIG. 8 is diagram showing a signal format of an encoded push-button transfer signal used in the present invention.

FIG. 8 shows the format of the push-button transfer signal transmitted from the exchange 30 for the case in which a TUP (telephone user part) protocol is used for the communication protocol between stations.

Referring to FIG. 8, the signal format includes a synchronization label at the header part, followed by a heading code "H0" and another heading code "H1" each having four bits, wherein a predetermined code indicative of the push-button transfer signal is set in each of the heading codes H0 and H1. After the heading code H1, a four-bit blank part is inserted as a filler, followed by a digit indicative of the relative location of the push-button signal in a succession of the push-button signals. After the foregoing digit, the push-button signals are attached in the form of eight codes each including four bits. Further, the stop digit "F" is inserted at the end of the format as the end code.

Figure 9:
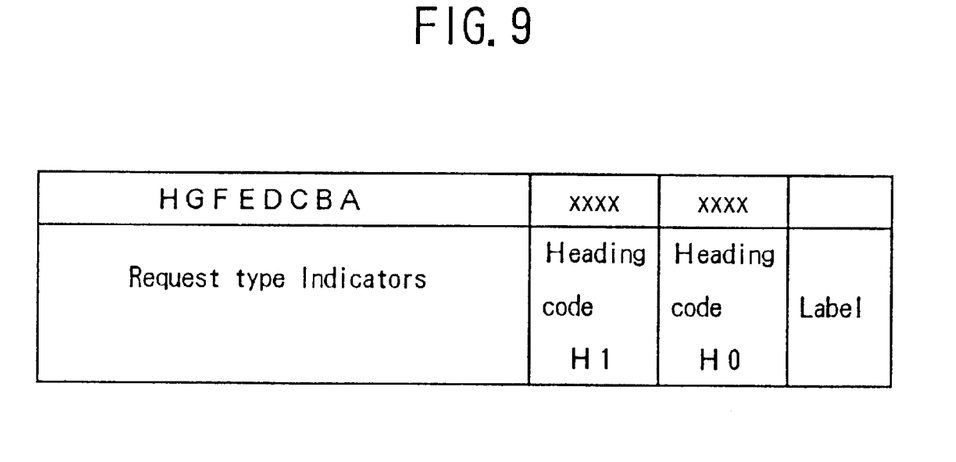
FIG. 9 is a diagram showing a signal format of a PBR connection/disconnection signal used in the present invention.

FIG. 9 shows the signal format used by the service system for requesting the connection or disconnection of the PBR for the case in which the TUP protocol is used for the communication protocol between the stations.

Referring to FIG. 9, the format includes a synchronization label at the header part, followed by heading codes H0 and H1 each having four bits, wherein a predetermined code indicative of the request for connecting or releasing the PBR is set in the foregoing heading codes H0 and H1. After the heading code H1, bits A–H are attached wherein the bits A–H represent the content of the request. For example, the connection request of the PBR 34 may be represented by the digit "0" of the bit A and the disconnect request of the PBR 34 may be represented by the digit "1"of the same bit A. Similarly, the digit "0" of the bit B may indicate the no-use of the audio channel and the digit "1" of the bit B may indicate the joint use of the audio channel. Further, the digit "0" of the bit C may indicate the real time transfer of the character and the digit "1" of the bit C may indicate the lump transfer of the characters in response to the detection of the end code #. In this case, the bits D–H are not used.

Figure 10:
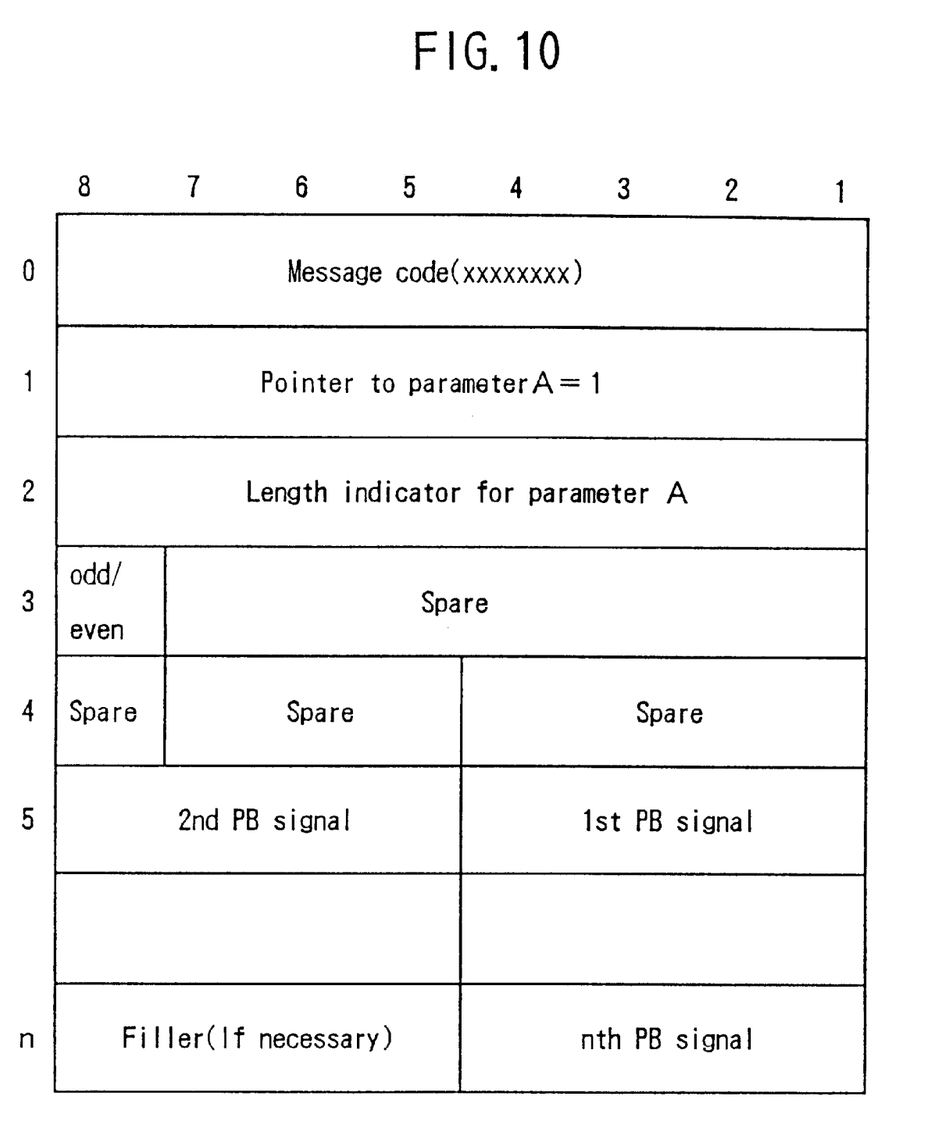
FIG. 10 is a diagram showing another signal format of an encoded push-button transfer signal used in the present invention.

FIG. 10 shows the signal format of the push-button transfer signal transmitted by the exchange 30 for the case in which an ISUP (INDS user part) protocol is used for the communication protocol between the stations.

Referring to FIG. 10, the header part in the first three octets (octet "0"–octet "2") holds a predetermined code (message code) indicative of the push-button transfer signal, together with a message length. On the other hand, the octet "3" holds information indicating whether the number of the push-button signal code is odd or even. Further, the octet 5 or later includes two push-button signal codes.

Figure 11:
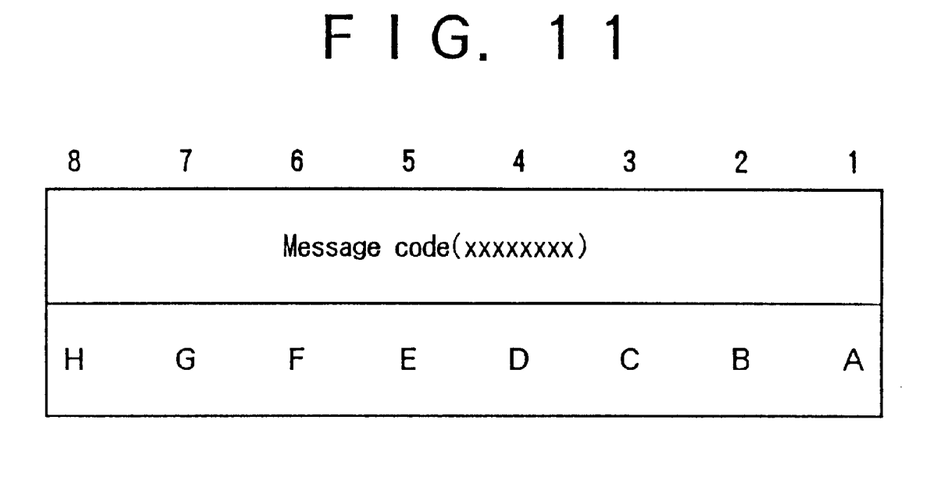
FIG. 11 is a diagram showing another signal format of a PBR connection/disconnection signal.

FIG. 11 shows the format of the PBR connection/disconnection request signal issued by the service system 36 for the case the ISUP protocol is used for the communication protocol between the stations.

Referring to FIG. 11, the first octet or octet "0" holds a predetermined code (message code) indicative of the PBR connection/disconnection request signal, and the next octet "1" holds bits A–H indicative of the content of the request. For example, the digit "0" of the bit A may indicate the connection request of the PBR 34 and the digit "1" of the bit A may indicate the disconnection request of the PBR 34. Further, the digit "0" of the bit B may indicate the no-use of the audio channel and the digit "1" of the bit B may indicate the joint use of the audio channel. Further, the digit "0" of the bit C may indicate the real time transfer of each character and the digit "1" of the bit C may indicate the lump transfer of the characters in response to the detection of the end code "#." In this case, the bits D–H are unused.

Figure 12:
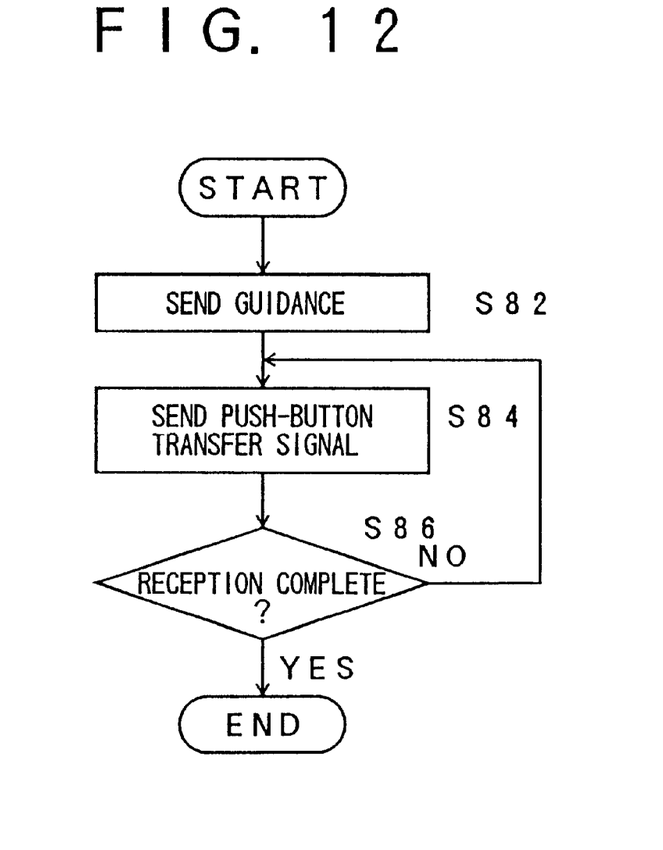
FIG. 12 is a flowchart showing an operation conducted by a service system included in the system of FIG. 2.

FIG. 12 shows a first example of the operation conducted by the service system 36 for push-button signal reception in the form of a flowchart. The process of FIG. 12 is carried out when it becomes necessary to let the user input the push-button signals.

Referring to FIG. 12, the service system 36 sends out an audio guidance to the terminal 32 in the step S82 for urging the user to hook the phone once and make an appropriate input by pressing down predetermined push buttons or keys, followed by pressing the button "#" when finished.

Next, in the step S84, the service system 36 receives the push-button transfer signals transmitted over the common signal line 38 from the exchange 30. After the step S84, a step S86 is conducted in which a discrimination is made whether or not the received push-button signals include the stop digit "F." When the result is No, the process step returns to the step S84, while when the result is YES, the reception of the push-button signals is terminated.

Figure 13:
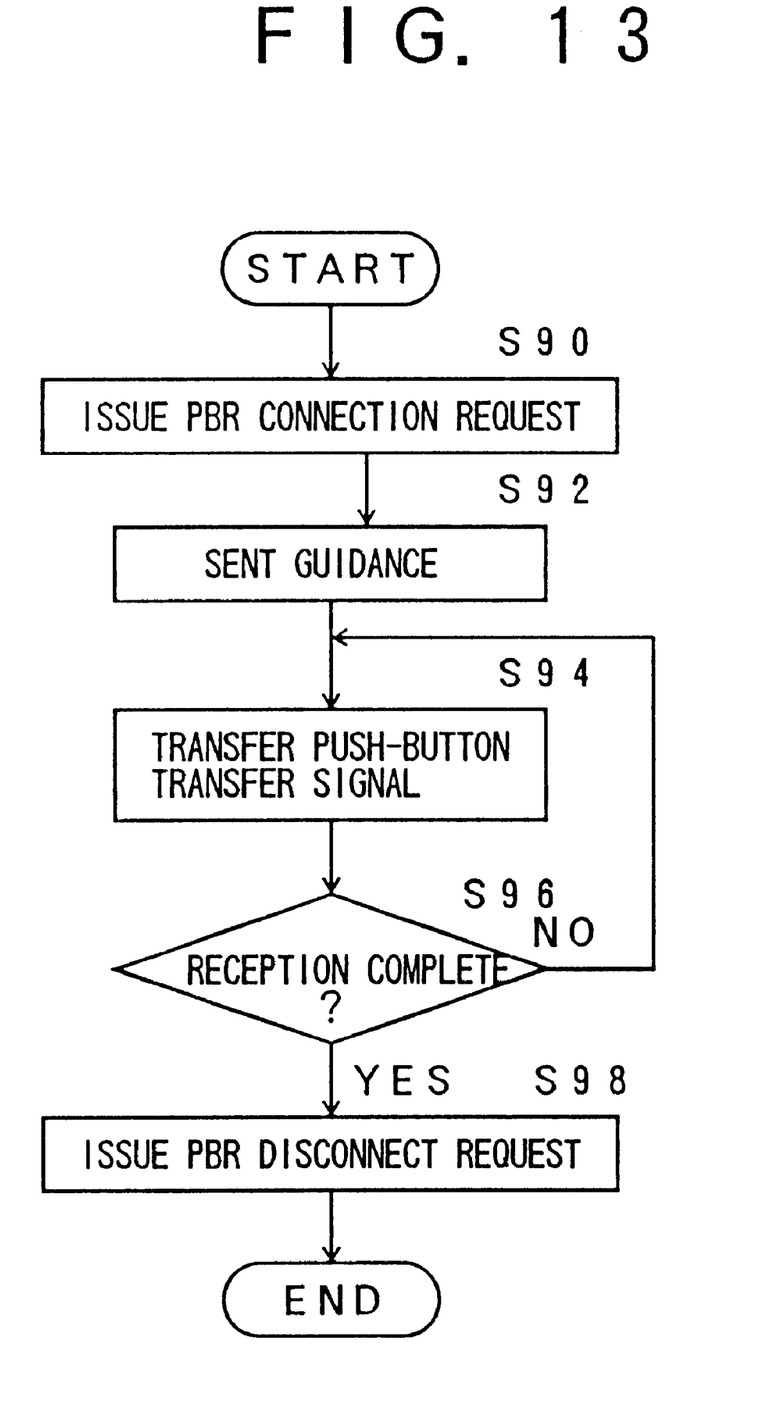
FIG. 13 is a flowchart showing another operation conducted by the service system of FIG. 2.

FIG. 13 shows a second example of the operation conducted by the service system 36 for push-button signal reception in the form of a flowchart. The process of FIG. 13 is activated when it becomes necessary to let the user of the terminal 32 to input push-button signals.

Referring to FIG. 13, the process starts with a step S90 in which the service system 36 issues a PBR connection request to the exchange 30 that accommodates the line to the user terminal 32. Next, in the step S92, the service system 36 transmits an audio guidance to the user terminal 32 with a message such as "please hook the phone and press predetermined buttons, then please press the button #."

After the step S92, the service system 36 receives the push-button transfer signal transmitted from the exchange 30 over the signal line 38. After discriminating in the step S96 as to whether or not the received push-button transfer signal includes the stop digit "F," and the process step returns to the step S94 when the received push-button transfer signal does not include the stop digit "F." When there is a stop digit "F," on the other hand, the process step proceeds to the step S98 and the service system 36 issues a PBR disconnection request to the exchange 30. Thereby, the push-button signal processing of the service system 36 is terminated.

Figure 14:
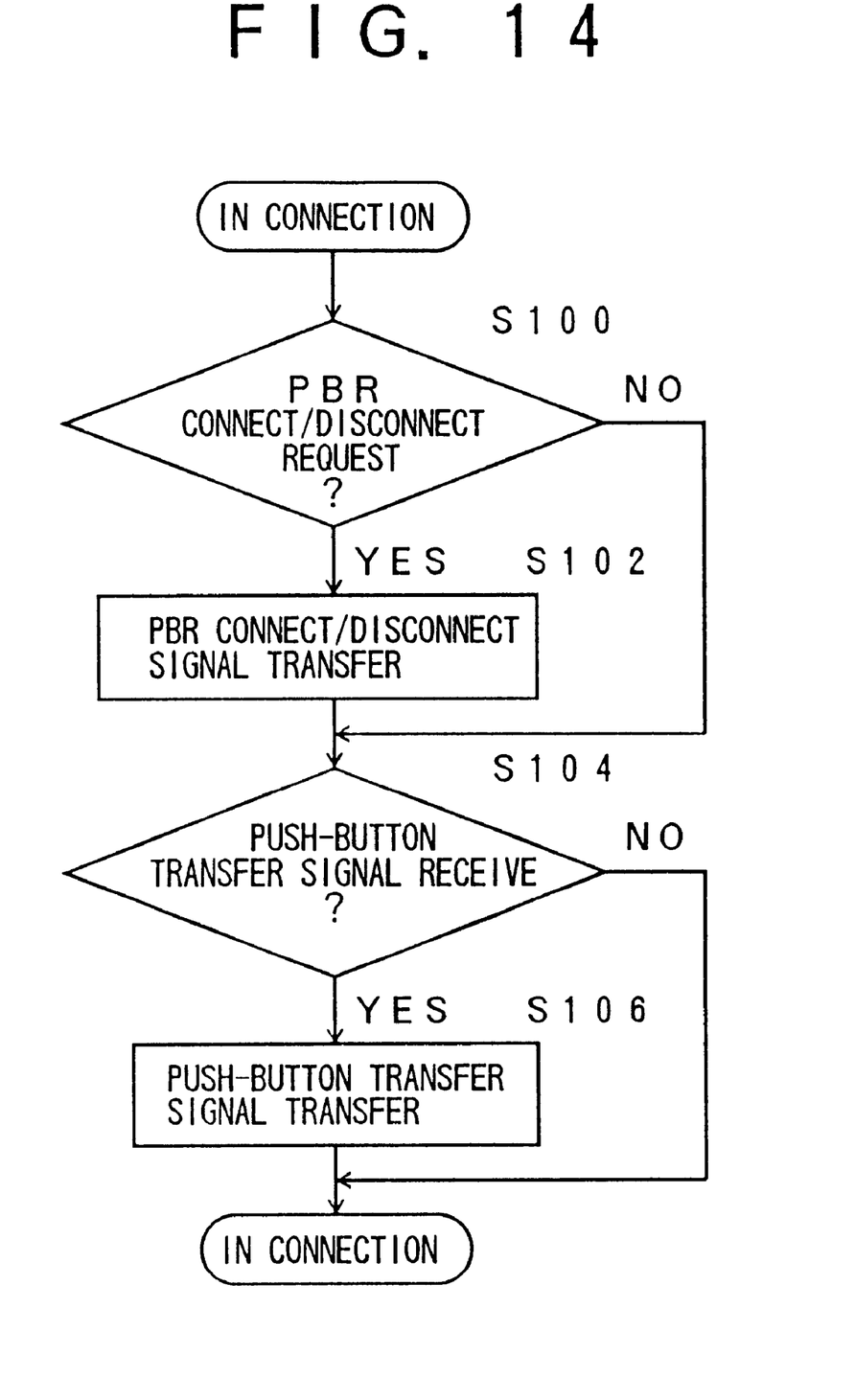
FIG. 14 is a flowchart showing an operation conducted by a relaying exchange included in network of FIG. 2.

FIG. 14 shows the process conducted by a relaying exchange provided inside the public network 31 in the form of a flowchart.

Referring to FIG. 14, the process starts with a step S1OO in which the relaying exchange receives the PBR connection or disconnection request transmitted from the service system 36 over the signal line 38 and the process step proceeds to the next step S102 wherein the received PBR connection or disconnection request is forwarded to the exchange 30 that accommodates the line connected to the user terminal 32. Next, the process step proceeds to the step S104 for receiving the push-button transfer signal transmitted from the exchange 30 over the line 38, and the push-button transfer signal thus received is forwarded further to the service system 36 in the next step S106.

In the present invention as explained heretofore, it will be understood that the PBR 34 is connected to the exchange 30 in the state that a circuit connection is established between the user terminal 32 and the service system 36 via the exchange 30, for detecting the push-button signals supplied from the user terminal 32 and for converting the same to a corresponding code. As the code thus converted is transmitted to the service system 36 over the signal line, it is no longer necessary to provide an additional PBR in the service system 36 and the cost of the service system 36 is reduced substantially. As the code thus obtained by the PBR 34 is transmitted to the service system 36 via the signal line 38, an excellent transmittance is guaranteed for the push-button signals and the problem of erroneous reception is reduced substantially.

In the construction of the present invention in which the PBR 34 is connected to the exchange 30 in response to the hooking at the end user terminal 32 or connection request of the service system 36, the PBR 34 can perform the detection and encoding of the push-button signal without problem.

By disconnecting the forward path of the audio-channel extending from the terminal to the service system at the time of connection of the PBR, unnecessary forward path connection of the audio-channel is eliminated.

Further, it is also possible to transmit the push-button signals from the user terminal to the service system also via the audio-channel. Thereby, the telecommunication system of the present invention is applicable also to the case in which the service system has a conventional construction including a PBR. In this case, both the process of the present invention and the process of the prior art shown in FIG. 1 can be used.

The state of the telecommunication system returns to the original state in response to the hooking at the end user terminal or in response to the disconnection request from the service system, in which the PBR is disconnected from the exchange 30.

Further, the present invention is not limited to the embodiments described heretofore, but various variations and modifications may be made without departing from the scope of the invention.

What is claimed is:

1. A transfer method of a push-button signal in an exchange connected to a network, said exchange accommodating therein a line to a terminal, said exchange including a push-button signal receiver for detecting a push-button signal created by said end terminal and for converting said push-button signal to a corresponding code, said method comprising the steps of:

detecting a push-button signal created by said terminal, during a state in which said exchange connects said terminal to a remote service system via said network, by using said push-button signal receiver;

encoding said push-button signal detected by said push-button signal receiver to a produce a push-button transfer signal corresponding to said push-button signal by using said push-button signal receiver; and transmitting said push-button transfer signal to said service system from said exchange to said service system via a signal line of said network in use for connection between said terminal and said service system.

2. A method as claimed in claim 1, wherein said exchange connects said push-button signal receiver thereto in response to an input from said terminal indicative of hooking.

3. A method as claimed in claim 1, wherein said service system issues a request to said exchange requesting a connection of said push-button signal receiver to said exchange, and said exchange connects said push-button signal receiver thereto in response to said request.

4. A method as claimed in claim 1, wherein said exchange creates a single push-button transfer signal and transfers said single push-button transfer signal to said service system each time a push-button signal for a single character is supplied thereto.

5. A method as claimed in claim 1, wherein said exchange creates a single push-button transfer signal and transfers said single push-button transfer signal to said service system in response to a lump of push-button signals corresponding to a plurality of characters.

6. A method as claimed in claim 1, wherein said exchange disconnects a forward path of an audio-channel extending from said terminal to said service system in response to a connection of said push-button signal receiver thereto.

7. A method as claimed in claim 2, wherein said exchange disconnects said push-button signal receiver when an input indicative of hooking comes in from said terminal in a state in which said push-button signal receiver is connected to said exchange.

8. A method as claimed in claim 3, wherein said service system issues a request to disconnect said push-button signal receiver to said exchange and said exchange disconnects said push-button signal receiver in response to said request from said service system.

\* \* \* \* \*